US009958065B2

United States Patent
Iwasaki et al.

(10) Patent No.: US 9,958,065 B2
(45) Date of Patent: May 1, 2018

(54) BRAKE DEVICE OF TRANSMISSION

(71) Applicant: Mazda Motor Corporation, Aki-gun, Hiroshima (JP)

(72) Inventors: Tatsuhiko Iwasaki, Hiroshima (JP); Shinya Kamada, Kure (JP); Yasuhiro Ogauchi, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 414 days.

(21) Appl. No.: 14/694,928

(22) Filed: Apr. 23, 2015

(65) Prior Publication Data
US 2015/0337958 A1 Nov. 26, 2015

(30) Foreign Application Priority Data

May 22, 2014 (JP) ................. 2014-106362

(51) Int. Cl.
| F16H 63/30 | (2006.01) |
| F16H 57/10 | (2006.01) |
| F16D 25/12 | (2006.01) |
| F16D 25/0638 | (2006.01) |
| F16H 57/02 | (2012.01) |
| F16D 13/69 | (2006.01) |

(52) U.S. Cl.
CPC ..... *F16H 63/3026* (2013.01); *F16D 25/0638* (2013.01); *F16D 25/12* (2013.01); *F16D 25/126* (2013.01); *F16H 57/10* (2013.01); *F16D 13/69* (2013.01); *F16H 57/02* (2013.01)

(58) Field of Classification Search
CPC .. F16H 63/3026; F16H 57/10; F16H 25/0638; F16H 25/126; F16D 2125/06
See application file for complete search history.

(56) References Cited

U.S. PATENT DOCUMENTS

| 9,267,598 B2 | 2/2016 | Kamada et al. |
| 9,709,102 B2 * | 7/2017 | Samie ................... F16D 25/044 |
| 2002/0094904 A1 * | 7/2002 | Kuramoto ............... F16D 25/02 |
| | | 475/207 |
| 2008/0296123 A1 * | 12/2008 | Vu ....................... F16D 25/0638 |
| | | 192/85.62 |
| 2015/0051800 A1 * | 2/2015 | Kamada .................. F16H 61/04 |
| | | 701/51 |

FOREIGN PATENT DOCUMENTS

| JP | 2005265063 A | 9/2005 |
| JP | 2013076460 A | 4/2013 |
| JP | 2013224716 A * | 10/2013 ............ F16H 61/04 |
| JP | 2014081048 A | 5/2014 |

* cited by examiner

*Primary Examiner* — Huan Le
*Assistant Examiner* — Lori Wu
(74) *Attorney, Agent, or Firm* — Alleman Hall Creasman & Tuttle LLP

(57) ABSTRACT

A brake device of a transmission is provided. The brake device includes a friction plate set including fixed friction plates and rotatable friction plates alternately disposed with each other, an engaging piston, and a clearance adjusting piston. A clearance adjusting hydraulic chamber is formed on a side of the clearance adjusting piston opposite to the friction plate set, and a concave portion is formed in a surface of the clearance adjusting piston on a friction plate set side. A base part of the engaging piston on a side opposite to the friction plate set is slidably fitted into the concave portion of the clearance adjusting piston and an engaging hydraulic chamber is formed by the base part and the concave part.

8 Claims, 12 Drawing Sheets

| | LOW CLUTCH (40) | HIGH CLUTCH (50) | LR BRAKE (60) | 26 BRAKE (70) | R35 BRAKE (80) |
|---|---|---|---|---|---|
| 1ST GEAR | O | | O | | |
| 2ND GEAR | O | | | O | |
| 3RD GEAR | O | | | | O |
| 4TH GEAR | O | O | | | |
| 5TH GEAR | | O | | | O |
| 6TH GEAR | | O | | O | |
| REVERSE GEAR | | | O | | O |

BRAKE DEVICE OF TRANSMISSION

BACKGROUND

The present invention relates to a brake device of a transmission to be mounted in a vehicle, and also relates to a technical field of transmissions for vehicles.

Automatic transmissions mounted in vehicles generally switch a drive force transmission path formed by planetary gear sets, etc., by selectively engaging a plurality of hydraulic friction engaging elements, and automatically set a gear position. While the gear position is basically formed by engaging two of the friction engaging elements, a first gear position in a drive range is conventionally formed by a single friction engaging element and an OWC (one-way clutch) to smoothen the gear shifting operation.

However, the price of the OWC is high. Moreover, the OWC operates as a rolling resistance in gear positions other than the first gear position in the drive range, which prevents an improvement in the fuel consumption performance of the engine and a reduction the power consumption of an electric motor in a hybrid vehicle and the like. Therefore, recently, the elimination of the OWC has been discussed.

In this case, for example, the first gear position is formed by engaging a low clutch and a low reverse brake. The low clutch is engaged at predetermined low gear positions including the first gear position. The low reverse brake is engaged at the first gear position and the reverse gear position. Shifting to the first gear position is performed by engaging the low reverse brake while the low clutch is engaged. Therefore, to smoothly shift to the first gear position from a different gear position, it is necessary to precisely control a timing of engaging the low reverse brake and an engaging force, with high responsiveness.

As a solution to the above disadvantage, JP2005-265063A discloses a brake device for a low reverse brake using a tandem hydraulic actuator having two pistons.

As illustrated in FIGS. 13A and 13B, a brake device 500 includes a plurality of fixed friction plates 531 spline-engaged to a transmission case 510 side, a plurality of rotatable friction plates 532 spline-engaged to a rotational member 520 side, an engaging piston 550 which engages a friction plate set 530 of the friction plates 531 and 532 against a biasing force of a return spring 540, and a clearance adjusting piston 560 disposed on a back side of the engaging piston 550. The friction plates 531 and 532 are alternately disposed between the transmission case 510 and the rotational member 520 accommodated inside the case 510.

In the brake device 500, as illustrated in FIG. 13A, the pistons 550 and 560 are kept at their retreat positions by the biasing force of the return spring 540 in an unengaged state, and a comparatively large clutch clearance (a total dimension of a gap formed between an engaging piston and a member which receives a pushing force of the piston, in a release state of the brake device) is formed. In this state, when a hydraulic pressure is supplied into a clearance adjusting hydraulic chamber 570 formed on a back side of the clearance adjusting piston 560, as illustrated in FIG. 13B, the pistons 550 and 560 move forward against the biasing force of the return spring 540 until the clearance adjusting piston 560 reaches an end of the stroke, and the clutch clearance is accordingly reduced. Thus, a so-called small clearance state can be obtained.

Therefore, by supplying the hydraulic pressure into the engaging hydraulic chamber 580 on the back side of the engaging piston 550 in this state, the brake device 500 is engaged with high responsiveness, and the timing of the engaging operation and the engaging force can be precisely controlled.

Moreover, in a state where the brake device 500 is released, since the comparatively large clutch clearance is formed, a resistance that acts on the rotational member 520 due to a viscosity resistance of a lubricant between the fixed friction plate 531 and the rotatable friction plate 532 becomes small, and degradation of the fuel consumption performance of the engine and the like can be reduced.

Meanwhile, in the brake device 500 of JP2005-265063A, as illustrated in FIGS. 13A and 13B, the engaging hydraulic chamber 580 is formed by fitting the engaging piston 550 into a first concave portion 512 formed in a vertical wall 511 of the transmission case 510. The clearance adjusting hydraulic chamber 570 is formed by fitting the clearance adjusting piston 560 into a second concave portion 513 formed on the back side of the first concave portion 512 of the vertical wall 511.

Further, when the hydraulic pressure is supplied into the clearance adjusting hydraulic chamber 570, the clearance adjusting piston 560 inside the second concave portion 513 of the transmission case 510 moves rearward (leftward in FIGS. 13A and 13B), and an end of the clearance adjusting piston 560 projects into the first concave portion 512 and contacts with the engaging piston 550 to move the engaging piston 550 to the friction plate set 530 side. Thus, the clutch clearance is reduced. However, due to the engaging piston 550 inside the first concave portion 512 moving rearward, a volume of the engaging hydraulic chamber 580 on the back side thereof becomes large.

When the volume of the engaging hydraulic chamber 580 is increased as above in adjusting the clutch clearance, the responsiveness to engage the brake device 500 when the hydraulic pressure is supplied into the engaging hydraulic chamber 580 degrades, and the improvement effect of the responsiveness by reducing the clutch clearance may be lost.

This disadvantage is not limited to arising in an automatic transmission, but it also arises similarly in other kinds of transmissions, such as continuously variable transmissions including a brake device having a similar configuration.

SUMMARY

The present invention is made in view of the above situations and aims to provide a brake device of a transmission having an engaging piston and a clearance adjusting piston, which keeps a volume of an engaging hydraulic chamber small when engaging the brake device.

According to one aspect of the present invention, a brake device of a transmission having the following configurations is provided.

The brake device of the transmission includes a friction plate set, an engaging piston and a clearance adjusting piston. The friction plate set includes a plurality of fixed friction plates spline-engaged with an inner circumferential surface of a transmission case and a plurality of rotatable friction plates spline-engaged with an outer circumferential surface of a predetermined rotational member, the plurality of fixed friction plates alternately disposed with the plurality of rotatable friction plates. The engaging piston is disposed on a side of the friction plate set in an axial direction of the friction plate set and for engaging with the friction plate set when hydraulic pressure is supplied into an engaging hydraulic chamber. The clearance adjusting piston is disposed on a side of the engaging piston opposite to the friction plate set and for reducing a clutch clearance by moving the engaging piston toward a friction plate set side when the hydraulic pressure is supplied into a clearance adjusting hydraulic chamber. The clearance adjusting hydraulic chamber is formed on a side of the clearance adjusting piston opposite to the friction plate set, and a concave portion is formed in a surface of the clearance adjusting piston on the friction plate set side. A base part of the engaging piston on the side opposite to the friction plate set is slidably fitted into the concave portion of the clearance adjusting piston and the engaging hydraulic chamber is formed by the base part and the concave portion.

With the above configuration, when the hydraulic pressure is supplied into the clearance adjusting hydraulic chamber first in engaging the brake device, the engaging piston moves toward the friction plate set side along with the clearance adjusting piston to reduce the clutch clearance. Then, when the hydraulic pressure is supplied into the engaging hydraulic chamber, the friction plate set is pushed by the engaging piston in a state where the clutch clearance is already small.

Therefore, the brake device is engaged with high responsiveness, and a precise control can be performed at a suitable timing. Moreover, in a state where the brake device is released, since the clutch clearance is maintained to be relatively large, a viscosity resistance of a lubricant that acts on the rotational member is reduced, and thus, for example, deterioration of a fuel consumption performance of the engine is suppressed.

Furthermore, according to this configuration, since the engaging hydraulic chamber is formed by fitting the base part of the engaging piston into the concave portion formed in the surface of the clearance adjusting piston on the friction plate set side, the volume of the engaging hydraulic chamber when the hydraulic pressure is not supplied into the engaging hydraulic chamber can be designed to be small, and when the hydraulic pressure is supplied into the clearance adjusting hydraulic chamber, the clearance adjusting piston and the engaging piston move integrally. Thus, the clutch clearance can be reduced while the volume of the engaging hydraulic chamber is maintained to be small. Therefore, unlike the brake device 500 in FIGS. 13A and 13B, the volume of the engaging hydraulic chamber does not increase when the clutch clearance is reduced.

Therefore, when the hydraulic pressure is supplied into the engaging hydraulic chamber, the hydraulic pressure can be supplied while the volume of the engaging hydraulic chamber is small. Thus, the engagement of the brake device can be precisely controlled with even higher responsiveness.

Further, an oil supply port of the engaging piston communicating with the engaging hydraulic chamber may be formed at a predetermined portion of a projecting part projecting toward the friction plate set side from the concave portion of the clearance adjusting piston, wherein the predetermined portion faces the inner circumferential surface of the transmission case. A hydraulic supply path leading to the oil supply port may be formed by an oil supply pipe extending into the transmission case from a circumferential wall of the transmission case and having a tip part that is provided as a seal part elastically contacting with the oil supply port and communicates with the oil supply port to be oil tight.

The engaging hydraulic chamber is formed by the concave portion of the clearance adjusting piston and the base part of the engaging piston fitted into the concave portion, and therefore, the engaging hydraulic chamber is separated from the inner circumferential surface of the transmission case. However, according to the above configuration, the oil supply port communicating with the engaging hydraulic chamber is provided at the portion of the projecting part facing the inner circumferential surface of the transmission case, and the oil supply port is led to the oil supply pipe extending into the transmission case from a circumferential wall of the transmission case. Thus, the configuration of supplying the hydraulic pressure into the engaging hydraulic chamber is simplified.

Specifically, compared with a case where a vertical wall is provided inside the transmission case and a hydraulic path extending radially inward inside the vertical wall and communicating with the engaging hydraulic chamber is provided, a dimension of the brake device or the entire transmission in the axial direction thereof can be shortened.

Further, since the tip part of the oil supply pipe is provided as the seal part elastically contacting with the oil supply port of the engaging piston, the oil tightness between the oil supply pipe and the oil supply port is not lost even by the movement of the engaging piston, and the fine sealability is maintained.

Further, an extending part may be provided to the clearance adjusting piston to extend toward the friction plate set side. A stopper member may be provided to restrict, at a predetermined position, a movement of the clearance adjusting piston in a direction which reduces the clutch clearance, when the extending part contacts the stopper member. The stopper member may be a retaining plate disposed on another side of the friction plate set in the axial direction and for receiving a pushing force applied to the friction plate set by the engaging piston.

According to this configuration, the movement of the clearance adjusting piston in the direction which reduces the clutch clearance is restricted when the extending part provided to the piston contacts with the stopper member. However, since the retaining plate for receiving the pushing force applied to the friction plate set by the engaging piston is used as the stopper member, a new component does not need to be provided as the stopper member and a number of components and a size of the brake device can be reduced.

Further, a movement restricting position of the clearance adjusting piston may be provided so that the clutch clearance becomes a predetermined small clearance state without the friction plate set being engaged, when the clearance adjusting piston is moved due to the supply of the hydraulic pressure into the clearance adjusting hydraulic chamber and the movement of the clearance adjusting piston is restricted by a contact between the extending part and the retaining plate in a state where the hydraulic pressure is not supplied into the engaging hydraulic chamber.

According to this configuration, the restricting position is set so that the clutch clearance becomes the predetermined small clearance state without the friction plate set being engaged, when the clearance adjusting piston is moved due to the supply of the hydraulic pressure into the clearance adjusting hydraulic chamber and the movement of the clearance adjusting piston is restricted in the state where the hydraulic pressure is not supplied into the engaging hydraulic chamber. Therefore, it is possible for the clutch clearance to be in the small clearance state while ensuring avoidance of a malfunction such as the engagement of the friction plate set before the hydraulic pressure is supplied into the engaging hydraulic chamber.

Furthermore, the extending part of the clearance adjusting piston may extend toward the friction plate set side through an outer circumferential side of the engaging piston. An interference avoiding portion for avoiding interference between the extending part and the oil supply pipe may be formed in the extending part.

According to this configuration, the extending part of the clearance adjusting piston can be disposed by utilizing, for example, a space formed between the engaging piston and the transmission case on the outer circumferential side of the engaging piston while avoiding interference between the extending part and the oil supply pipe. Therefore, a compact structure for restricting the movement of the clearance adjusting piston at the predetermined position can be achieved, and a size increase of the brake device or the entire transmission can be suppressed.

DETAILED DESCRIPTION OF EMBODIMENTS

Hereinafter, embodiments of the present invention are described in detail with reference to the appended drawings.

Figures 1, 2:
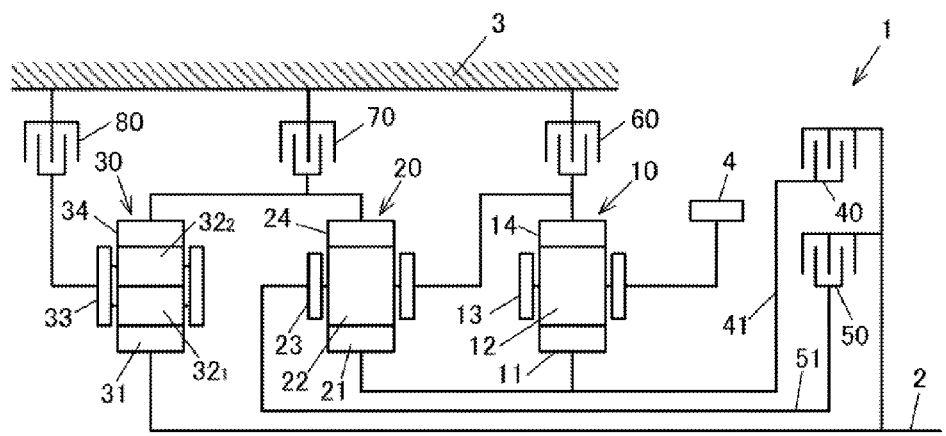
FIG. 1 is a substantial view of an automatic transmission according to embodiments of the present invention.
FIG. 2 is a table illustrating relationships of combinations of engaged friction engaging elements and gear positions.

FIG. 1 is a substantial view illustrating a configuration of an automatic transmission 1 according to embodiments of the present invention. The automatic transmission 1 has an input shaft 2 into which an engine output is inputted via a torque converter (not illustrated). A first planetary gear set, a second planetary gear set, and a third planetary gear set (hereinafter, referred to as "the first gear set," "the second gear set," and "the third gear set") 10 to 30 are disposed on the input shaft 2 in this order from a drive source side (right side of FIG. 1).

Moreover, as friction engaging elements configured to switch a drive force transmission path formed by the gear sets 10 to 30, a low clutch 40 and a high clutch 50 configured to selectively transmit a drive force from the input shaft 2 to the gear sets 10, 20, and 30 side are provided on the input shaft 2, and an LR (low reverse) brake 60 configured to fix a predetermined rotational element of the gear set 10, a 26 brake 70 configured to fix a predetermined rotational element of the gear set 20, and an R35 brake 80 configured to fix a predetermined rotational element of the gear set 30 are arranged in this order from the drive source side.

Among the first to third gear sets 10 to 30, the first gear set 10 and the second gear set 20 are a single pinion type. The first gear set 10 includes a sun gear 11, a plurality of pinions 12 meshed with the sun gear 11, a carrier 13 supporting the pinions 12, and a ring gear 14 meshed with the pinions 12. The second gear set 20 includes a sun gear 21, a plurality of pinions 22 meshed with the sun gear 21, a carrier 23 supporting the pinions 22, and a ring gear 24 meshed with the pinions 22.

Moreover, the third gear set 30 is a double pinion type and includes a sun gear 31, a plurality of first pinions $32_1$ meshed with the sun gear 31, a plurality of second pinions $32_2$ meshed with the first pinions $32_1$, a carrier 33 supporting the pinions $32_1$ and $32_2$, and a ring gear 34 meshed with the second pinions $32_2$.

Further, the input shaft 2 is directly connected with the sun gear 31 of the third gear set 30. The sun gear 11 of the first gear set 10 is coupled to the sun gear 21 of the second gear set 20 and they are connected with an output member 41 of the low clutch 40. Moreover, an output member 51 of the high clutch 50 is connected with the carrier 23 of the second gear set 20.

Moreover, the ring gear 14 of the first gear set 10 is coupled to the carrier 23 of the second gear set 20, and the LR brake 60 is disposed on an outer circumferential side (a side closer to a wall of the transmission case 3) of the ring gear 14 and the carrier 23 inside the transmission case 3. The ring gear 24 of the second gear set 20 is coupled to the ring gear 34 of the third gear set 30, and the 26 brake 70 is disposed on an outer circumferential side of the ring gear 24 and the ring gear 34 inside the transmission case 3. Further, the R35 brake 80 is disposed between the carrier 33 of the third gear set 30 and the transmission case 3. Furthermore, an output gear 4 configured to transmit the output of the automatic transmission 1 to drive wheels (not illustrated) is connected with the carrier 13 of the first gear set 10.

By the above configuration, the automatic transmission 1 provides first to sixth gear positions in the drive range and a reverse gear position in the R range, as illustrated in FIG. 2, by combining engaging states of the low clutch 40, the high clutch 50, the LR brake 60, the 26 brake 70, and the R35 brake 80.

Here, the LR brake 60 disposed on an outer circumferential side of the first gear set 10 of this embodiment may be referred to as the brake device. Hereinafter, the LR brake 60 is described as the brake device of the present invention.

Figure 3:
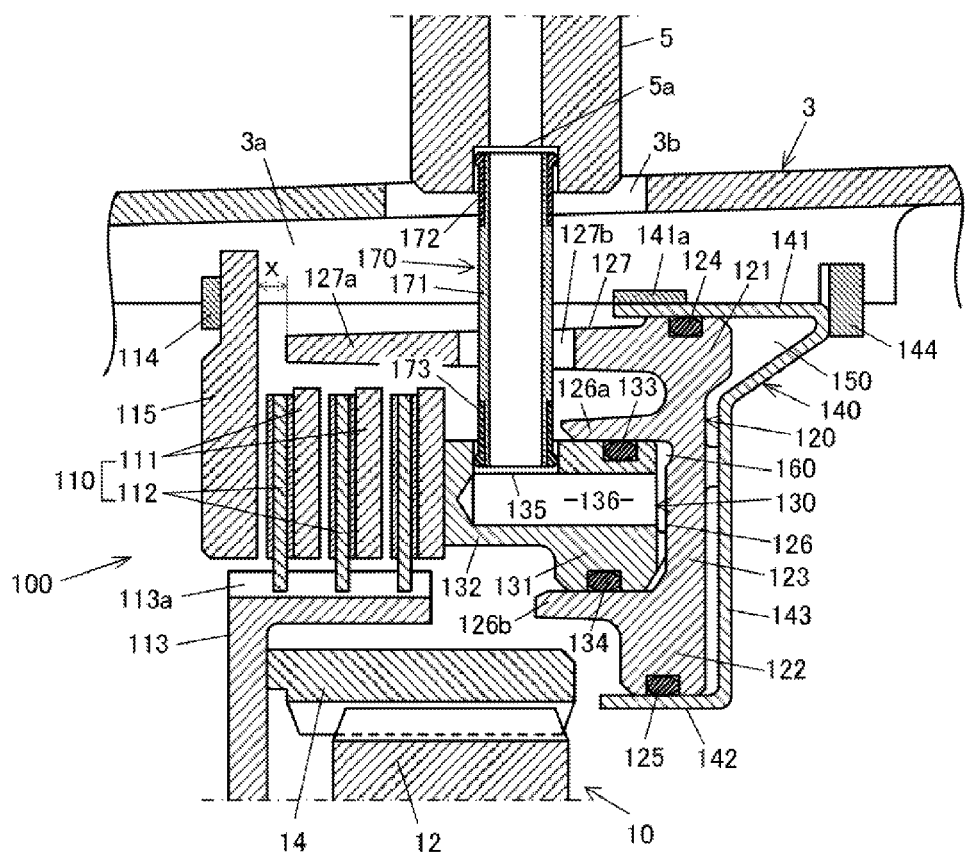
FIG. 3 is a cross-sectional view of a brake device of according to a first embodiment.
Figure 4:
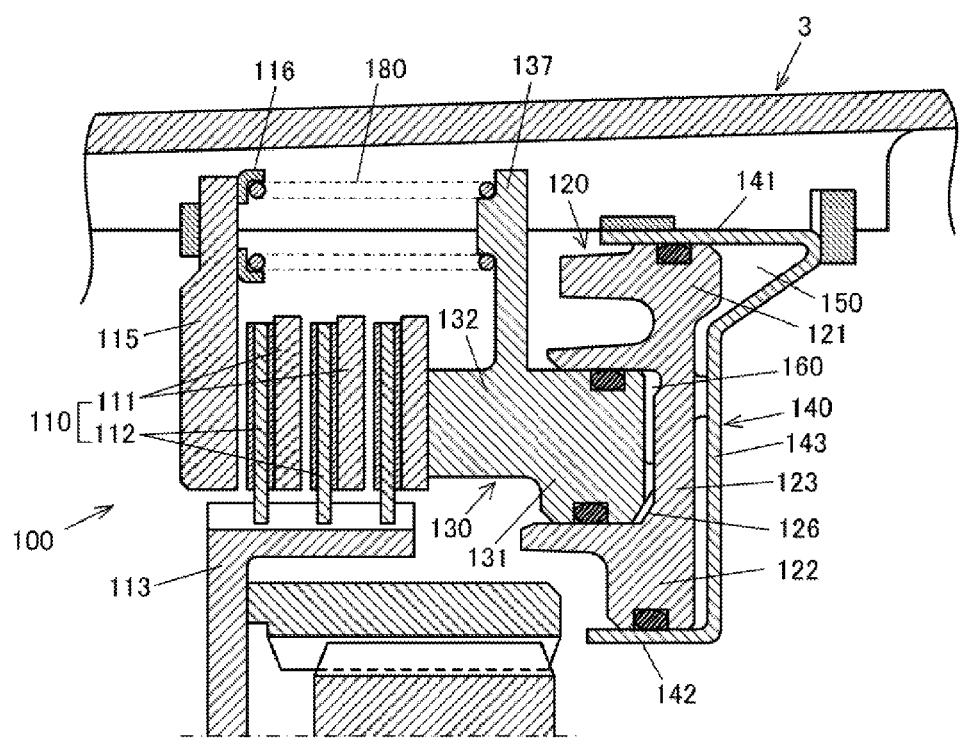
FIG. 4 is a cross-sectional view of the brake device taken at a different cross-section from FIG. 3.
Figure 5:
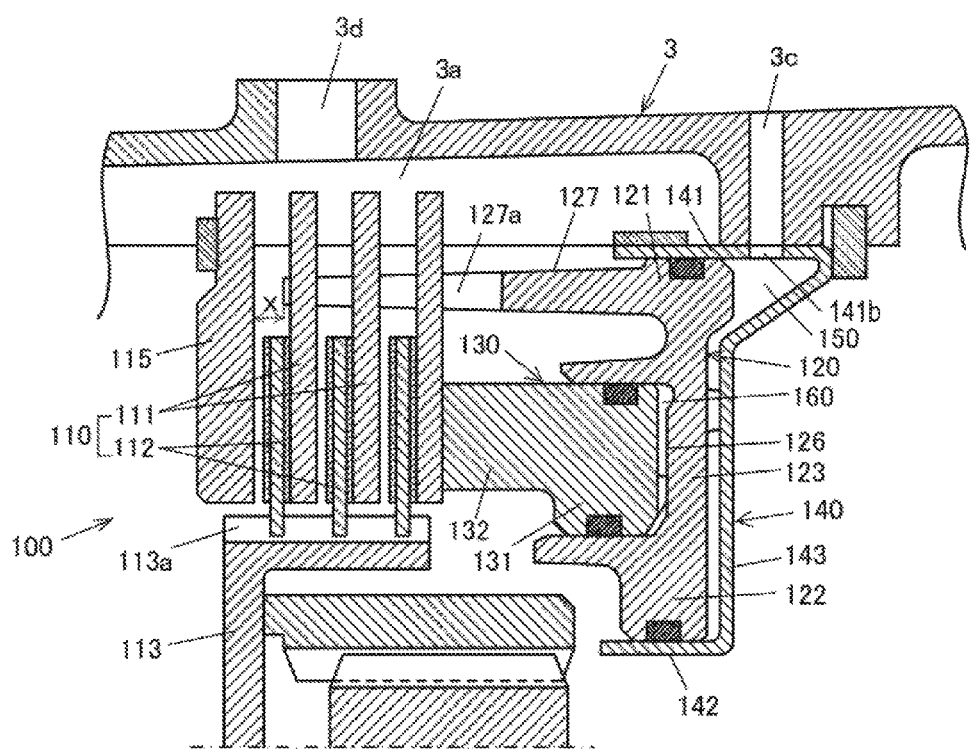
FIG. 5 is a cross-sectional view of the brake device taken at a different cross-section from FIGS. 3 and 4.

As illustrated in FIGS. 3 to 5, a brake device 100 of the first embodiment includes a friction plate set 110. The friction plate set 110 is comprised of a plurality of fixed friction plates 111 and a plurality of rotatable friction plates 112 disposed alternately with each other. Outer circumferential parts of the plurality of fixed friction plates 111 are engaged with a spline 3a formed in an inner circumferential surface of the transmission case 3. Inner circumferential parts of the plurality of rotatable friction plates 112 are engaged with a spline 113a formed in an outer circumferential surface of a hub member 113. The hub member 113 is coupled to the ring gear 14 of the first gear set 10 and the carrier 23 of the second gear set 20 illustrated in FIG. 1.

On a counter-drive source side of the friction plate set 110 (hereinafter, the counter-drive source side (left side of the drawings) is referred to as "rearward" and the drive source side (right side of the drawings) is referred to as "forward"), a retaining plate 115 is disposed to be engaged with the spline 3a of the transmission case 3 in a similar manner as the fixed friction plates 111, and retained by a snap ring 114 so as not to slip off rearward. Moreover, a clutch clearance adjusting piston (hereinafter, referred to as the "adjusting piston") 120, an engaging piston 130, and a cylinder 140 where the pistons 120 and 130 are accommodated, are disposed on a front side of the friction plate set 110.

The cylinder 140 is structured by a thin metal plate and formed into a ring-like shape, of which a cross section has a substantially channel shape opening to the rear side, by an outer circumferential surface part 141, an inner circumferential surface part 142, and a vertical surface part 143 between the outer and inner circumferential surface parts 141 and 142. Further, in a state where the outer circumferential surface part 141 is fitted into the inner circumferential surface of the transmission case 3, a protrusion 141a provided to the outer circumferential surface part 141 is engaged with the transmission case 3 to prevent the cylinder 140 from turning. Moreover, a snap ring 144 is provided to prevent the cylinder 140 from slipping off forward.

Moreover, the adjusting piston 120 has an outer circumferential part 121, an inner circumferential part 122, and a vertical wall part 123 between the outer and inner circumferential parts 121 and 122. The outer circumferential part 121 and the inner circumferential part 122 are fitted onto the outer circumferential surface part 141 and the inner circumferential surface part 142 of the cylinder 140 via seal members 124 and 125, respectively. Thus, a clutch clearance adjusting oil-pressure chamber (hereinafter, referred to as the "adjusting oil-pressure chamber") 150 is formed on a front side (on the side opposite to the friction plate set 110, on the counter friction plate set 110 side) of the adjusting piston 120 to be oil tight by the vertical wall 123 and the cylinder 140.

Further, in a surface of the vertical wall 123 of the adjusting piston 120 on the friction plate set 110 side, an outer circumferential cylindrical part 126a and an inner circumferential cylindrical part 126b are provided to project to the friction plate set 110 side, and thus, a concave portion 126 opening to the friction plate set 110 side is formed.

On the other hand, the engaging piston 130 has a base part 131 which is the part opposite to the friction plate set 110 side, and a projecting part 132 of which a tip surface opposes to the foremost fixed friction plate 111 in the friction plate set 110. The base part 131 is fitted into the concave portion 126 of the adjusting piston 120 via outer and inner circumferential seal members 133 and 134. Thus, an engaging oil-pressure chamber 160 formed to be oil tight by the base part 131 of the engaging piston 130 and the concave portion 126 of the adjusting piston 120.

Moreover, as illustrated in FIG. 3, a hole extending inside the projecting part 132 in an axial direction of the engaging piston 130 toward the friction plate set 110 side from a front end surface of the base part 131 on the counter friction plate set 110 side, and a hole extending inward of a radial direction of the engaging piston 130 from an outer circumferential surface of the projecting part 132 and intersecting with the axial hole are formed at a predetermined circumferential position of the engaging piston 130. The radial hole serves as an oil supply port 135 and the axial hole serves as a communicating hole 136 communicating the oil supply port 135 with the engaging oil-pressure chamber 160.

Further, an oil-pressure supply device 5 (e.g., a control valve unit) is disposed to be oriented toward an inside of the transmission case 3 from an opening 3b formed in the transmission case 3. An oil supply pipe 170 of which an end is inserted into a pipe insertion hole 5a of the oil-pressure supply device 5 extends toward the inside of the transmission case 3, and the other end of the oil supply pipe 170 communicates with the oil supply port 135 of the engaging piston 130. Thus, the oil-pressure supply path from the oil-pressure supply device 5 to the engaging oil-pressure chamber 160 is formed.

Figure 6:
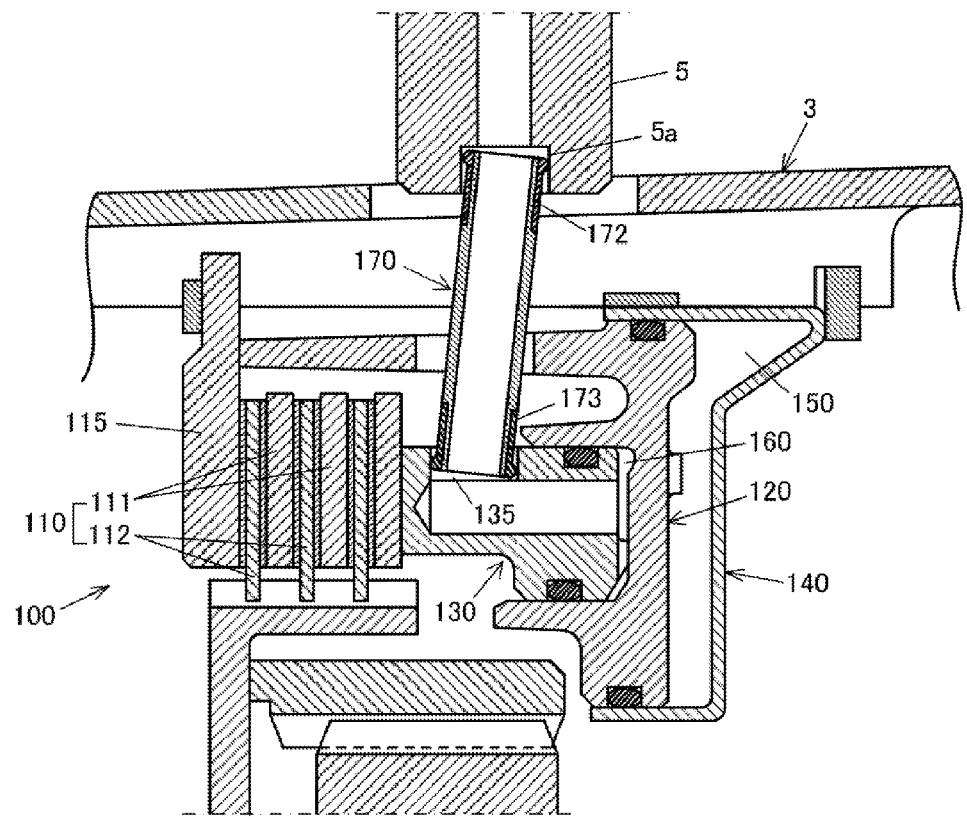
FIG. 6 is a cross-sectional view illustrating a small clearance state of the brake device.

The oil supply pipe 170 includes a pipe body 171, and elastic seal members 172 and 173 attached to both radial end parts of the pipe body 171 and made of rubber, flexible resin or the like. The radial end parts of the oil supply pipe 170 are elastically press-fitted into the pipe insertion hole 5a of the oil-pressure supply device 5 and the oil supply port 135. Further, when a stroke of the engaging piston 130 is performed, the oil supply pipe 170 inclines as illustrated in FIG. 6 and, thus, the engaging piston 130 smoothly moves while the seal members 172 and 173 maintain required sealability.

Note that, for the adjusting oil-pressure chamber 150, as illustrated in FIG. 5, an oil-pressure supply path 3c is formed to pass through the transmission case 3 to enter into the transmission case 3 and communicate with the adjusting oil-pressure chamber 150 via an opening 141b formed in the outer circumferential surface part 141 of the cylinder 140. Moreover, an oil supply port 3d is also formed in the transmission case 3 to supply a lubricant (oil in this embodiment) into the friction plate set 110.

Moreover, in the brake device 100, as illustrated in FIG. 4, front spring receiving parts 137 extending radially outward are formed to a plurality of circumferential positions of the projecting part 132 of the engaging piston 130, and rear spring receiving parts 116 are provided, for example, by fixing a separate member, to a plurality of circumferential positions of a front surface of an outer circumferential part of the retaining plate 115 so as to oppose the respective front spring receiving parts 137. A return spring 180 of the engaging piston 130 is attached between each pair of the opposing front and rear spring receiving parts 137 and 116.

In this case, the oil supply pipe 170 is provided at a different position from the return springs 180 in the circumferential direction so as to avoid interference between the return springs 180 and the oil supply pipe 170.

Further, as illustrated in FIGS. 3 and 5, a comb-like extending part 127 passing through the outer circumferential side of the engaging piston 130 and extending to the retaining plate 115 side is provided in a surface of the outer circumferential part 121 of the adjusting piston 120 on the friction plate set 110 side.

A plurality of teeth 127a arranged in the circumferential direction of the extending part 127 pass through valley parts of the splines of the fixed friction plates 111, and tips of the teeth 127a oppose the front surface of the retaining plate 115. The teeth 127a are designed to have gaps of a predetermined dimension x between a tip end surface of each tooth 127a and the front surface of the retaining plate 115 in the release state of the brake device 100.

Note that, as illustrated in FIG. 3, the oil supply pipe 170 passes through a hole 127b formed in a predetermined tooth among the teeth 127a of the extending part 127 and is connected with the oil supply port 135 of the engaging piston 130, so as to avoid interference with the extending part 127.

Next, the operation of the brake device 100 of this embodiment is described. In engaging the brake device 100, through supplying the oil pressure into the adjusting oil-pressure chamber 150 first by the oil-pressure supply path 3c in the state illustrated in FIGS. 3 and 5, the stroke of the adjusting piston 120 to the friction plate set 110 side is performed and, inside the concave portion 126 of the piston 120, the front end surface of the base part 131 of the engaging piston 130 contacts with a bottom of the concave portion 126. Thus, the stroke of the engaging piston 130 to the friction plate set 110 side is also performed integrally with the stroke of the adjusting piston 120, against the biasing force of the return springs 180.

At a timing that the stroke of the adjusting piston 120 is performed by the dimension x, the tips of the teeth 127a of the comb-like extending part 127 of the adjusting piston 120 contact with the front surface of the retaining plate 115, and the strokes of the pistons 120 and 130 are restricted in this state.

Here, as illustrated in FIG. 6, an interval between the adjacent fixed friction plates 111 and an interval between the rearmost fixed friction plate 111 and the retaining plate 115 are narrowed, and the clutch clearance becomes zero or an extremely small value. Thus, a so-called small clearance state is obtained.

Note that, the oil supply pipe 170 of which one end is fitted into the oil supply port 135 of the engaging piston 130 inclines according to the stroke of the engaging piston 130 in this state. Here, since both of the end parts of the pipe 170 are fitted into the pipe insertion hole 5a of the oil-pressure supply device 5 and the oil supply port 135 via the elastic seal members 172 and 173, the required sealability is maintained in these fitted portions, and the oil supply pipe 170 does not serve as resistance to the strokes of the engaging piston 130 and the adjusting piston 120.

Next, through supplying the oil pressure into the engaging oil-pressure chamber 160 by the oil supply pipe 170 in the state illustrated in FIG. 6, the engaging piston 130 pushes the friction plate set 110 against the retaining plate 115. Thus, each rotatable friction plate 112 is sandwiched either by the fixed friction plates 111 adjacent thereto or by the rearmost fixed friction plate 111 and the retaining plate 115. Therefore, the brake device 100 is engaged.

Here, since the clutch clearance is already in the small clearance state, the brake device 100 is smoothly engaged through the supply of the oil pressure into the engaging oil-pressure chamber 160, and thus, high responsiveness of the engaging operation can be obtained and the precise engaging control can be performed.

On the other hand, in the release state of the brake device 100, since a comparatively large clutch clearance is secured, an increase of the rotational resistance of the fixed friction plates 111 and the retaining plate 115 with the rotational friction plates 112 caused by, for example, the viscosity resistance of operational oil is reduced. As a result, both of an improvement of the fuel consumption performance of the engine in the release state of the brake device 100, and the high responsiveness and the precise control of the engagement of the brake device 100 can be achieved.

Further, particularly with the brake device 100, since the engaging oil-pressure chamber 160 is formed by fitting the base part 131 of the engaging piston 130 into the concave portion 126 formed in the surface of the adjusting piston 120 on the friction plate set 110 side, the volume of the oil-pressure chamber 160 when the oil pressure supply is not performed can be designed to be small by setting a fitting depth of the base part 131 into the concave portion 126, etc.

Moreover, since the strokes of the adjusting piston 120 and the engaging piston 130 are integrally performed when the oil pressure is supplied into the adjusting oil-pressure chamber 150, the volume of the engaging oil-pressure chamber 160 does not increase due to the strokes. Therefore, in supplying the oil pressure into the engaging oil-pressure chamber 160, the oil pressure can be supplied into the oil-pressure chamber 160 while the volume thereof is small, and thus, the engagement of the brake device 100 can be precisely performed with even higher responsiveness.

Further, with the brake device 100, as a configuration of supplying the oil pressure into the engaging oil-pressure chamber 160 separated inwardly from the inner circumferential surface of the transmission case 3, the oil supply pipe 170 extending into the case 3 from the oil-pressure supply device 5 provided outside the transmission case 3, and communicating with the oil supply port 135 formed in the engaging piston 130 is used, and therefore, compared with a case where the oil pressure is supplied from the oil path formed in the vertical wall of the transmission case, an increase of a dimension of the transmission in the axial direction can be reduced.

Figure 7:
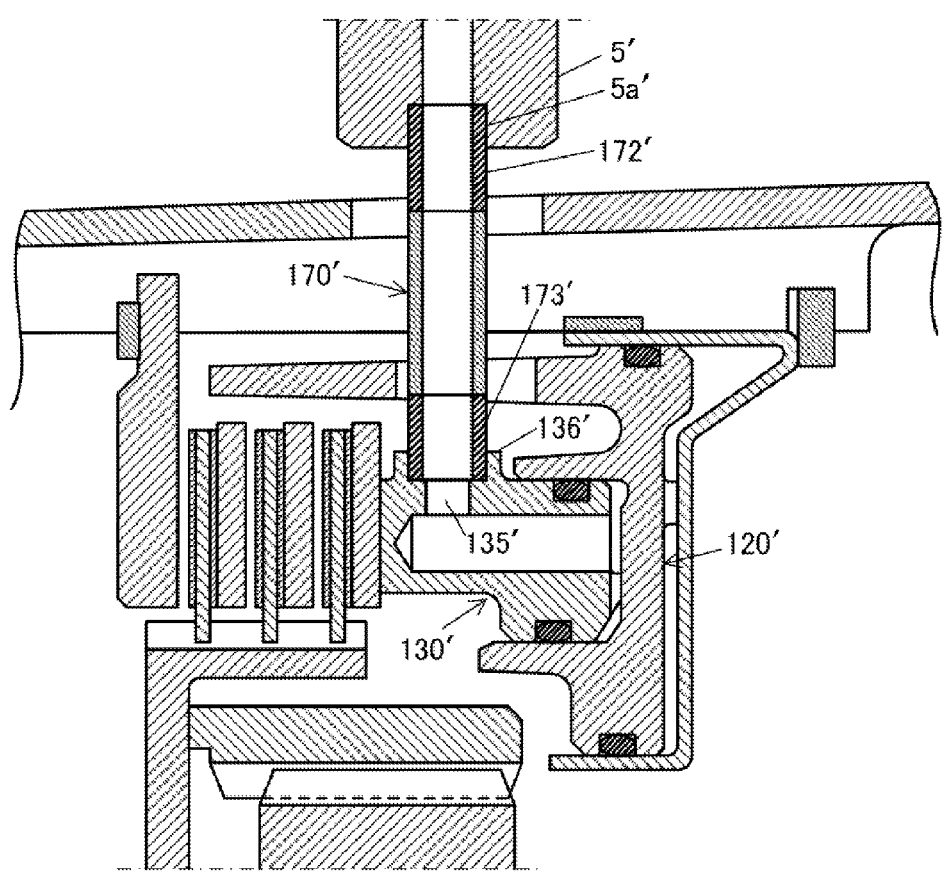
FIG. 7 is a cross-sectional view of the brake device in a first modification.

Note that, as a configuration of communicating the oil supply pipe 170 to the oil supply port 135, instead of the configuration of directly inserting the end part of the oil supply pipe 170 illustrated in FIG. 3 into the oil supply port 135, a configuration of a first modification illustrated in FIG. 7 may be adopted. In the first modification, a boss part 136' is provided to project around an oil supply port 135' in an engaging piston 130', and pipe-shaped elastic seal members 172' and 173' provided to both radial end parts of an oil supply pipe 170' are press-fitted into the boss part 136' and a pipe insertion hole 5a' of the oil-pressure supply device 5', respectively. Thus, the oil-pressure supply device 5' is communicated to the oil supply port 135' to be oil tight via the oil supply pipe 170'.

According to this modification, when the oil supply port 135' moves according to a stroke of the engaging piston 130', the seal members 172' and 173' at the radial end parts of the oil supply pipe 170' bend. Therefore, also according to this modification, the stroke of the engaging piston 130' is smoothly performed while maintaining the required sealability, and the oil supply pipe 170' does not serve as a resistance to the strokes of the engaging piston 130' and the adjusting piston 120'.

Figure 8:
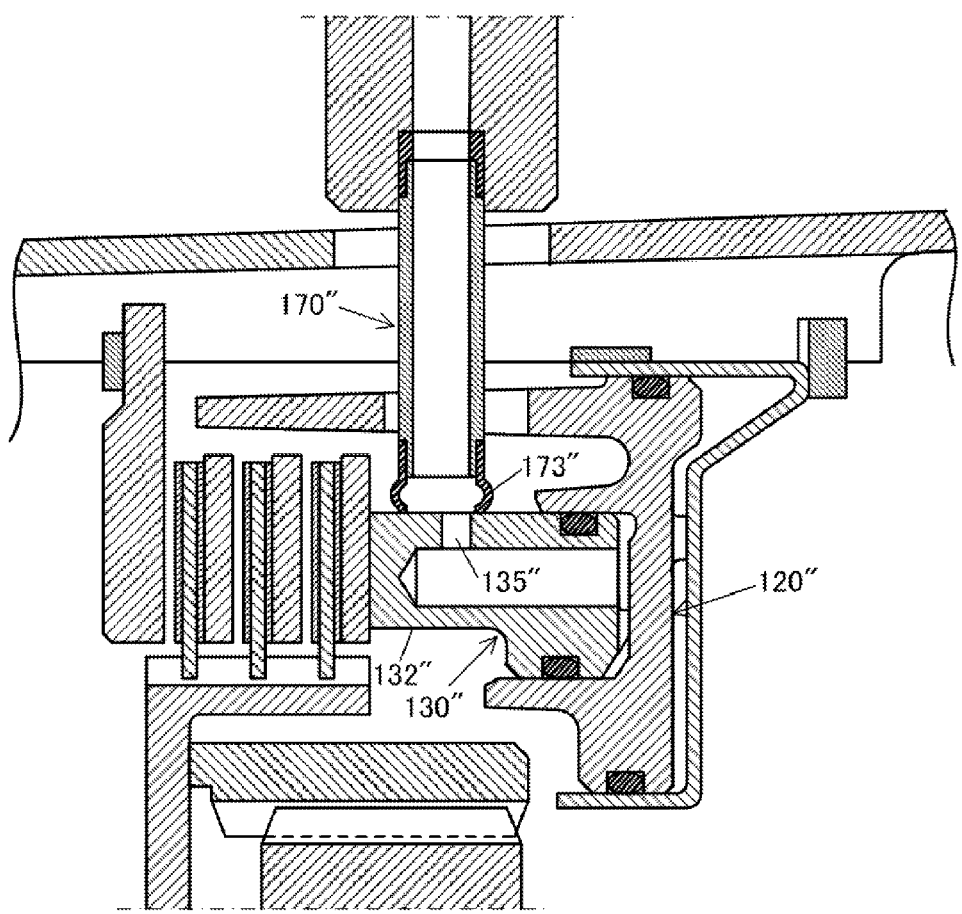
FIG. 8 is a cross-sectional view of the brake device in a second modification.

Moreover, in a second modification illustrated in FIG. 8, an end part of an oil supply pipe 170" on an engaging piston 130" side is provided with a seal member 173" that is elastically attached through pressure, to an outer circumferential surface of a projecting part 132" of the engaging piston 130" in a state where the seal member 173" surrounds an oil supply port 135". By the seal member 173", the oil supply pipe 170" is communicated with the oil supply port 135" to be oil tight within the stroke range of the engaging piston 130".

In this modification, the oil supply pipe 170" does not incline and the seal member 173" does not bend when a stroke of the engaging piston 130" is performed, and the seal member 173" relatively slides on the outer circumferential surface of the projecting part 132" of the engaging piston 130". Therefore, also according to this modification, the stroke of the engaging piston 130" is smoothly performed while maintaining the required sealability, and the oil supply pipe 170" does not serve as a resistance to the strokes of the engaging piston 130" and the adjusting piston 120".

Figure 9:
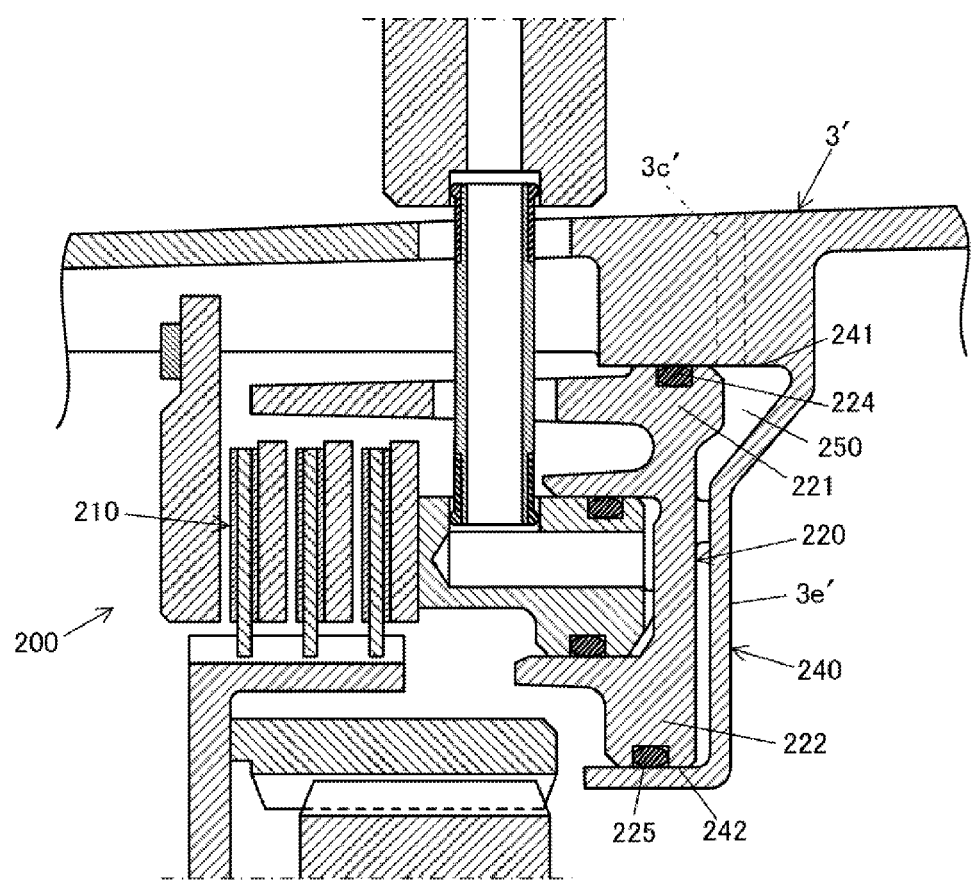
FIG. 9 is a cross-sectional view of a brake device according to a second embodiment.

Moreover, with the brake device 100 of the first embodiment, the cylinder 140 is structured by the ring-like member that is formed by the thin metal plate and has the substantially channel shape in cross section; however, a cylinder 240 may be integrally provided to a transmission case 3' as a brake device 200 according to a second embodiment illustrated in FIG. 9.

In other words, with the brake device 200 of the second embodiment, the transmission case 3' is integrally provided with a vertical wall 3e' extending radially inward from an inner circumferential surface of the transmission case 3' and a surface of the vertical wall 3e' on the friction plate set 210 side is concaved. Thus, the cylinder 240 is formed.

Further, an adjusting piston 220 is fitted into the cylinder 240. An outer circumferential part 221 and an inner circumferential part 222 are slidably fitted onto an outer circumferential cylinder surface 241 and an inner circumferential cylinder surface 242 of the cylinder 240 via seal members 224 and 225, respectively. Thus, an adjusting oil-pressure chamber 250 is formed to be oil tight. Other configurations are similar to the first embodiment.

According to this embodiment, the cylinder 140, the snap ring 144 (stopper member) and the like which are provided as non-integrated members illustrated in FIGS. 3 to 6 are not required, and the number of components and a work load of attaching non-integrated members are reduced. Furthermore, as indicated by the virtual lines in the transmission case 3', an oil path 3c' through which the oil pressure is supplied into the adjusting oil-pressure chamber 250 can be directly formed in the outer circumferential wall of the transmission case 3'. Therefore, compared with a case where the oil path is formed in the vertical wall, the thickness of the vertical wall can be thinner and an increase of a dimension of the transmission in the axial direction can be reduced.

Figure 10:
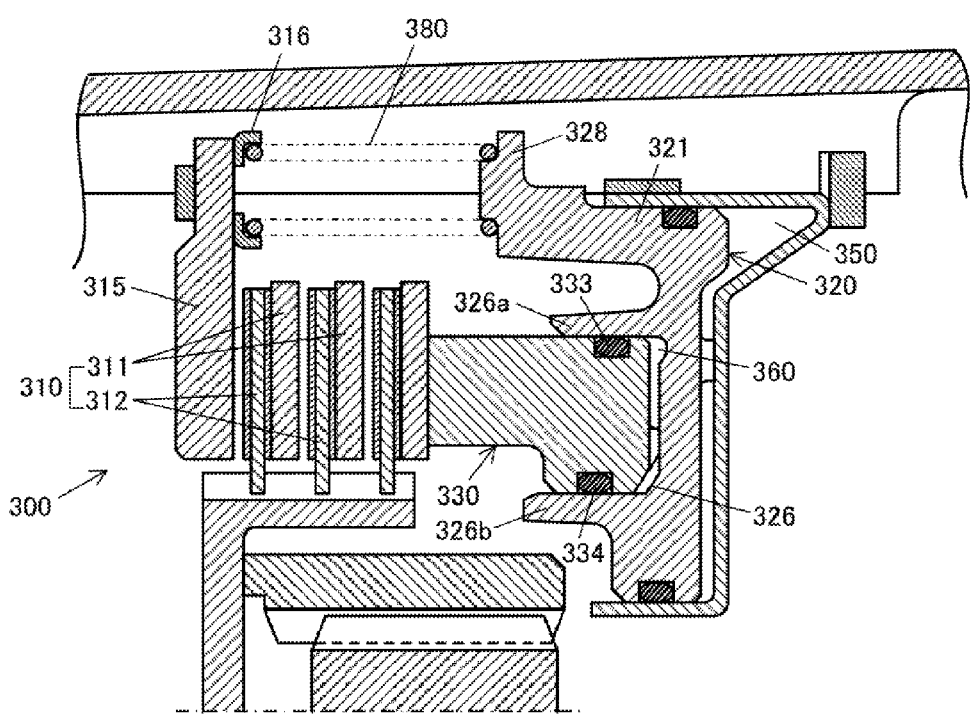
FIG. 10 is a cross-sectional view of a brake device according to a third embodiment.

Next, a third embodiment is described with reference to FIG. 10. With a brake device 300 of the third embodiment, instead of the configuration in which the return springs 180 are attached between the engaging piston 130 and the retaining plate 115 in the first embodiment, return springs 380 are attached between an adjusting piston 320 and a retaining plate 315.

In other words, in the third embodiment, front spring receiving parts 328 extending radially outward are provided at a plurality of circumferential positions of an outer circumferential part 321 of the adjusting piston 320, and rear spring receiving parts 316 are provided at a plurality of circumferential positions of a front surface of an outer circumferential part of the retaining plate 315 so as to oppose to the front spring receiving parts 328. A return spring 380 of the adjusting piston 320 is attached between each pair of the opposing front and rear spring receiving parts 328 and 316. Other configurations are similar to the first embodiment.

Also in this embodiment, in engaging the brake device 300, similar to the brake device 100 of the first embodiment, the oil pressure is first supplied into an adjusting oil-pressure chamber 350, and strokes of the adjusting piston 320 and an engaging piston 330 to a friction plate set 310 side are performed until an extending part (not illustrated) provided to the adjusting piston 320 contacts with a front surface of the retaining plate 315. Thus, the clutch clearance becomes the small clearance state.

Next, by supplying the oil pressure into the engaging oil-pressure chamber 360, the engaging piston 330 pushes the friction plate set 310 against the retaining plate 315, and thus, each rotatable friction plate 312 is sandwiched by the fixed friction plates 311 adjacent thereto or by the rearmost fixed friction plate 311 and the retaining plate 315, and the brake device 300 is engaged.

Here, since the clutch clearance is already in the small clearance state, the brake device 300 is engaged with high responsiveness. Moreover, when the oil pressure is supplied into the adjusting oil-pressure chamber 350, the strokes of the adjusting piston 320 and the engaging piston 330 are integrally performed, and therefore, the volume of the engaging oil-pressure chamber 360 does not increase due to the strokes. Thus, similar to the brake device 100 of the first embodiment, the engaging control can also be precisely performed by the brake device 300 with even higher responsiveness.

Meanwhile, the actual clutch clearance in the small clearance state of the clutch clearance controlled by the adjusting piston (i.e., a stroke amount of the engaging piston when the oil pressure is supplied into the engaging oil-pressure chamber in the small clearance state) tends to gradually become large mainly due to wearing of the rotatable friction plates attached with friction members at both surfaces thereof.

On the other hand, according to the brake device 300 of the third embodiment, in releasing the brake device 300, by performing a control of discharging the oil pressure from the engaging oil-pressure chamber 360 first and then from the adjusting oil-pressure chamber 350, when the adjusting piston 320 is moved to the counter friction plate set 310 side by the biasing force of the return springs 380 due to the oil pressure discharge from the adjusting oil-pressure chamber 350, the engaging piston 330 moves to the counter friction plate set 310 side while maintaining the positional relationship with the adjusting piston 320 by the friction caused by seal members 333 and 334 with an inner circumferential surface of an outer circumferential cylinder part 326a and an outer circumferential surface of an inner circumferential cylinder part 326b forming a concave portion 326 of the adjusting piston 320.

Therefore, after the brake device 300 is released, in engaging the brake device 300 again, when the strokes of the adjusting piston 320 and the engaging piston 330 are performed to the friction plate set 310 side by supplying the oil pressure into the adjusting oil-pressure chamber 350, the stroke of the engaging piston 330 is performed to the position to which the friction plate set 310 was pushed in the previous engagement, and the clutch clearance substantially becomes zero.

Thus, for example, even if the clutch clearance in the release state of the brake device 300 is increased due to the friction of the friction members of the rotatable friction plates 312 or the like, when engaging the brake device 300, the clutch clearance is always substantially zero, and the high responsiveness of the brake device 300 is maintained.

Figure 11:
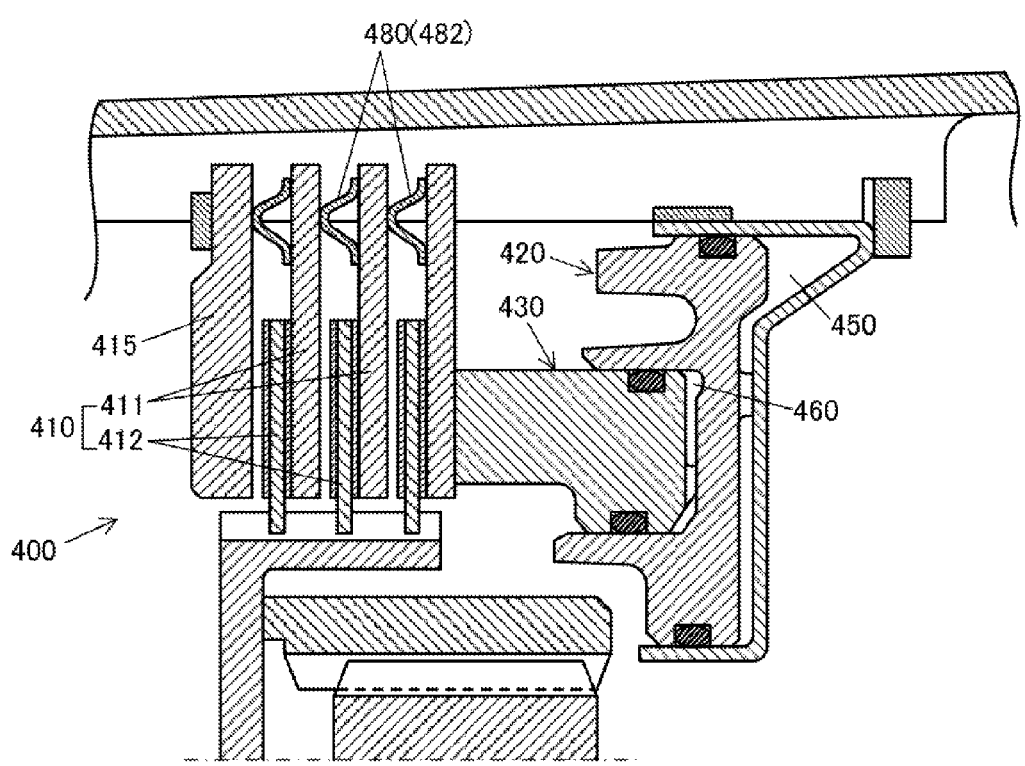
FIG. 11 is a cross-sectional view of a brake device according to a fourth embodiment.

Next, a fourth embodiment is described with reference to FIG. 11. With a brake device 400 of the fourth embodiment, instead of the return springs 180 and 380 in the first and third embodiments, a separate spring 480 is provided between each pair of adjacent fixed friction plates 411 of a friction plate set 410 and between a rearmost fixed friction plate 411 and a retaining plate 415, so as to separate them. Other configurations are similar to the first and third embodiments.

Figure 12:
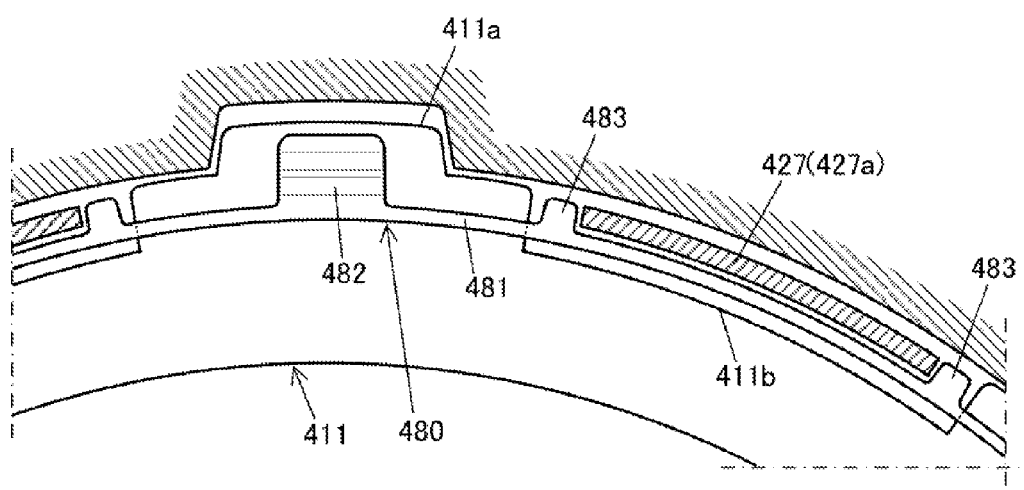
FIG. 12 is a partial front view of a separating spring of the brake device in the fourth embodiment.
Figure 13A:
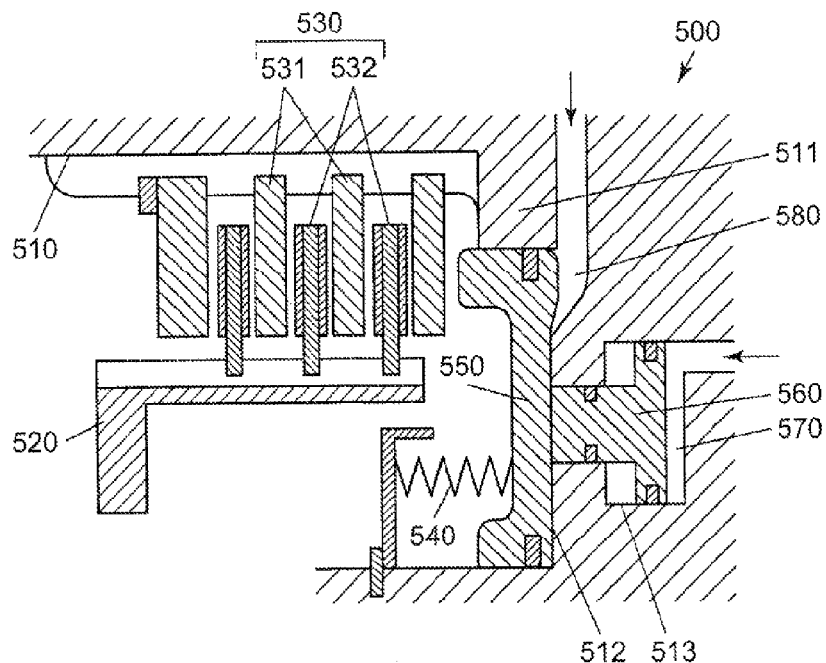
FIGS. 13A and 13B show cross-sectional views illustrating a brake device of a conventional automatic transmission.
Figure 13B:
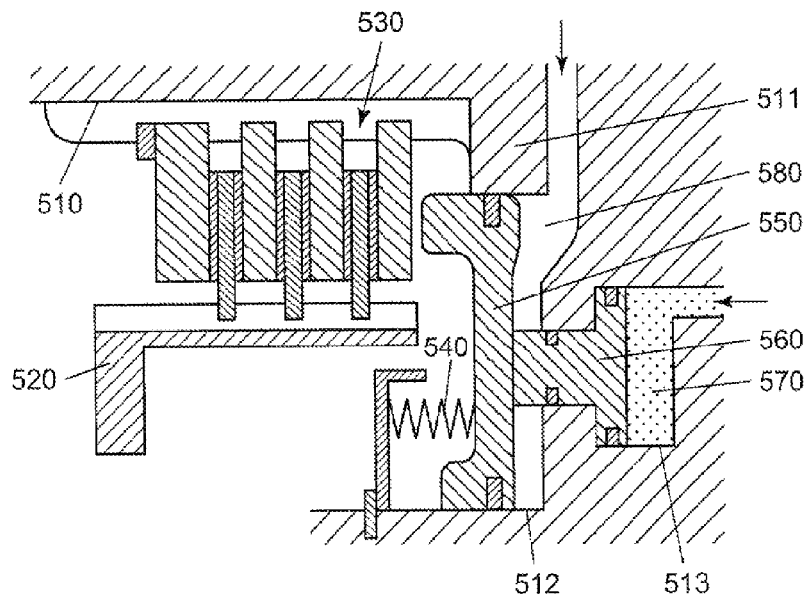

Each separating spring 480 is formed by punching a spring plate material, and as illustrated in FIG. 12, in a ring-like body 481, biasing parts 482 projecting radially outward are provided at a plurality of circumferential positions corresponding to ridge parts 411a of splines of the fixed friction plates 411, and the biasing parts 482 are bent to bulge. Each biasing part 482 intervenes, in a pushed state, between the fixed friction plates 411 adjacent thereto and between the rearmost fixed friction plate 411 and the retaining plate 415. The biasing part 482 biases the fixed friction plates 411 and the retaining plate 415 to separate them from each other by elastic force.

Moreover, as illustrated in FIG. 12, the separating spring 480 is formed with a plurality of protruding parts 483 protruding radially outward at predetermined circumferential positions of the ring-like body 481, and the protruding parts 483 engage with both circumferential ends of each of teeth 427a of a comb-like extending part 427 of an adjusting piston 420 extending through valley parts 411b of the splines of the corresponding fixed friction plates 411. Thus, the separating spring 480 is prevented from turning.

According to this embodiment, similar to the brake devices 100 and 300 of the first and third embodiments, in engaging the brake device 400, by supplying the oil pressure into the adjusting oil-pressure chamber 450 first to perform strokes of the adjusting piston 420 and the engaging piston 430 to the friction plate set 410 side, the clutch clearance becomes the small clearance state. Therefore, when oil pressure is supplied into the engaging oil-pressure chamber 460 next, the brake device 400 is engaged with high responsiveness.

Particularly, according to the brake device 400 of this embodiment, when the brake device 400 is not engaged, an interval between the adjacent fixed friction plates 411 and an interval between the rearmost fixed friction plate 411 and the retaining plate 415 are kept substantially even at a comparatively wide interval by the elastic force of the biasing parts 482 of the separate springs 480. And when the brake device 400 is engaged, and the strokes of the adjusting piston 420 and the engaging piston 430 are performed against the elastic force of the biasing parts 482 of the separate springs 480 and the clutch clearance becomes the small clearance state, the intervals are also kept substantially even at zero or an extremely narrow interval.

Therefore, a locally high resistance can be prevented from being produced between either one of the fixed friction plate 411 and the retaining plate 415, and the rotatable friction plate 412. Compared with a case where the intervals are uneven, the improvement of the fuel consumption performance of the engine and the like can be achieved.

Here, as the separate spring, only the part corresponding to the biasing part 482 which is bent to bulge may be formed, and an end thereof may be fixedly attached to the fixed friction plates. Alternatively, the separate spring may be formed by a wire made of spring material.

Note that, in the above first to fourth embodiments, the present invention is applied to the LR brake 60 of the automatic transmission of which the substantial part is illustrated in FIG. 1. However, the present invention may also similarly be applied to the other brakes 70 and 80, automatic transmissions with a transmission mechanism having a different configuration, and also brake devices in continuously variable transmissions.

As described above, according to the present invention, the brake device excellent in the responsiveness in engaging can be achieved while shortening the dimension of the entire transmission in the axial direction. Thus, the present invention can suitably be utilized in transmissions including such a brake device and technical field of manufacturing vehicles installed with the transmissions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS 3, 3' Transmission Case
110, 210, 310, 410 Friction Plate Set
111, 311, 411 Fixed Friction Plate
112, 312, 412 Rotatable Friction Plate
115, 315, 415 Retaining Plate
120, 220, 320, 420 Adjusting Piston
126 Concave Portion
127 Extending Part
127b Hole (Interference Avoiding Portion)
130, 230, 330, 430 Engaging Piston
131 Base Part
132 Projecting Part
135, 135', 135" Oil Supply Port
140, 240 Cylinder
150, 250, 350, 450 Adjusting Oil-pressure Chamber
160, 360, 460 Engaging Oil-pressure Chamber
170, 170', 170" Oil Supply Pipe
180, 380 Return Spring
480 Separating Spring

What is claimed is:

1. A brake device of a transmission, comprising:
a friction plate set including a plurality of fixed friction plates spline-engaged with an inner circumferential surface of a transmission case and a plurality of rotatable friction plates spline-engaged with an outer circumferential surface of a predetermined rotational member, the plurality of fixed friction plates alternately disposed with the plurality of rotatable friction plates;
an engaging piston disposed on a side of the friction plate set in an axial direction of the friction plate set and for engaging with the friction plate set when hydraulic pressure is supplied into an engaging hydraulic chamber; and
a clearance adjusting piston disposed on a side of the engaging piston opposite to the friction plate set and for reducing a clutch clearance by moving the engaging piston toward a friction plate set side when the hydraulic pressure is supplied into a clearance adjusting hydraulic chamber,
wherein the clearance adjusting hydraulic chamber is formed on a side of the clearance adjusting piston opposite to the friction plate set, and a concave portion is formed in a surface of the clearance adjusting piston on the friction plate set side,
wherein a base part of the engaging piston on the side opposite to the friction plate set is slidably fitted into the concave portion of the clearance adjusting piston and the engaging hydraulic chamber is formed by the base part and the concave portion,
wherein an oil supply port of the engaging piston, communicating with the engaging hydraulic chamber, is formed at a predetermined portion of a projecting part projecting toward the friction plate set side from the concave portion of the clearance adjusting piston, wherein the predetermined portion faces the inner circumferential surface of the transmission case, and
wherein a hydraulic supply path leading to the oil supply port is formed by an oil supply pipe extending into the transmission case from a circumferential wall of the transmission case and having a tip part that is provided as a seal part elastically contacting with the oil supply port and communicates with the oil supply port to be oil tight.

2. The brake device of the transmission of claim 1, wherein an extending part is provided to the clearance adjusting piston to extend toward the friction plate set side,
wherein a stopper member is provided to restrict, at a predetermined position, a movement of the clearance adjusting piston in a direction which reduces the clutch clearance, when the extending part contacts the stopper member, and wherein the stopper member is a retaining plate disposed on another side of the friction plate set in the axial direction and for receiving a pushing force applied to the friction plate set by the engaging piston.

3. The brake device of the transmission of claim 2, wherein a movement restricting position of the clearance adjusting piston is provided so that the clutch clearance becomes a predetermined clearance state without the friction plate set being engaged, when the clearance adjusting piston is moved due to the supply of the hydraulic pressure into the clearance adjusting hydraulic chamber and the movement of the clearance adjusting piston is restricted by a contact between the extending part and the retaining plate in a state where the hydraulic pressure is not supplied into the engaging hydraulic chamber.

4. The brake device of the transmission of claim 3, wherein the extending part of the clearance adjusting piston extends toward the friction plate set side along an outer circumferential side of the engaging piston, and
   wherein an interference avoiding portion for avoiding interference between the extending part and the oil supply pipe is formed in the extending part.

5. The brake device of the transmission of claim 2, wherein the extending part of the clearance adjusting piston extends toward the friction plate set side along an outer circumferential side of the engaging piston, and
   wherein an interference avoiding portion for avoiding interference between the extending part and the oil supply pipe is formed in the extending part.

6. The brake device of the transmission of claim 1, wherein a movement restricting position of the clearance adjusting piston is provided so that the clutch clearance becomes a predetermined clearance state without the friction plate set being engaged, when the clearance adjusting piston is moved due to the supply of the hydraulic pressure into the clearance adjusting hydraulic chamber and a movement of the clearance adjusting piston is restricted by a contact between an extending part and a retaining plate in a state where the hydraulic pressure is not supplied into the engaging hydraulic chamber.

7. The brake device of the transmission of claim 1, wherein an extending part of the clearance adjusting piston extends toward the friction plate set side along an outer circumferential side of the engaging piston, and
   wherein an interference avoiding portion for avoiding interference between the extending part and the oil supply pipe is formed in the extending part.

8. A brake device of a transmission, comprising:
   a friction plate set including a plurality of fixed friction plates spline-engaged with an inner circumferential surface of a transmission case and a plurality of rotatable friction plates spline-engaged with an outer circumferential surface of a predetermined rotational member, the plurality of fixed friction plates alternately disposed with the plurality of rotatable friction plates;
   an engaging piston disposed on a side of the friction plate set in an axial direction of the friction plate set and for engaging with the friction plate set when hydraulic pressure is supplied into an engaging hydraulic chamber; and
   a clearance adjusting piston disposed on a side of the engaging piston opposite to the friction plate set and for reducing a clutch clearance by moving the engaging piston toward a friction plate set side when the hydraulic pressure is supplied into a clearance adjusting hydraulic chamber,
   wherein the clearance adjusting hydraulic chamber is formed on a side of the clearance adjusting piston opposite to the friction plate set, and a concave portion is formed in a surface of the clearance adjusting piston on the friction plate set side,
   wherein a base part of the engaging piston on the side opposite to the friction plate set is slidably fitted into the concave portion of the clearance adjusting piston and the engaging hydraulic chamber is formed by the base part and the concave portion,
   wherein an extending part is provided to the clearance adjusting piston to extend toward the friction plate set side,
   wherein a stopper member is provided to restrict, at a predetermined position, a movement of the clearance adjusting piston in a direction which reduces the clutch clearance, when the extending part contacts the stopper member,
   wherein the stopper member is a retaining plate disposed on another side of the friction plate set in the axial direction and receives a pushing force applied to the friction plate set by the engaging piston,
   wherein a movement restricting position of the clearance adjusting piston is provided so that the clutch clearance becomes a predetermined clearance state without the friction plate set being engaged, when the clearance adjusting piston is moved due to the supply of the hydraulic pressure into the clearance adjusting hydraulic chamber and the movement of the clearance adjusting piston is restricted by a contact between the extending part and the retaining plate in a state where the hydraulic pressure is not supplied into the engaging hydraulic chamber,
   wherein the extending part of the clearance adjusting piston extends toward the friction plate set side along an outer circumferential side of the engaging piston, and
   wherein an interference avoiding portion for avoiding interference between the extending part and an oil supply pipe is formed in the extending part.

* * * * *